United States Patent
Rattunde (10) Patent No.: US 10,801,826 B2
(45) Date of Patent: Oct. 13, 2020

(54) TACTILE RUNOUT MEASUREMENT AND LENGTH MEASUREMENT

(71) Applicant: Rattunde & Co GmbH, Ludwigslust (DE)

(72) Inventor: Ulrich Rattunde, Bentwisch (DE)

(73) Assignee: Rattunde AG, Ludwigslust (DE)

( * ) Notice: Subject to any disclaimer, the term of this patent is extended or adjusted under 35 U.S.C. 154(b) by 326 days.

(21) Appl. No.: 15/777,400

(22) PCT Filed: Nov. 14, 2016

(86) PCT No.: PCT/EP2016/077573
§ 371 (c)(1),
(2) Date: May 18, 2018

(87) PCT Pub. No.: WO2017/085013
PCT Pub. Date: May 26, 2017

(65) Prior Publication Data
US 2018/0335291 A1    Nov. 22, 2018

(30) Foreign Application Priority Data
Nov. 20, 2015  (DE) .................. 10 2015 120 177

(51) Int. Cl.
*G01B 5/207* (2006.01)
*G01B 5/24* (2006.01)
*G01B 5/20* (2006.01)

(52) U.S. Cl.
CPC .............. *G01B 5/207* (2013.01); *G01B 5/20* (2013.01); *G01B 5/24* (2013.01)

(58) Field of Classification Search
CPC . G01B 11/25; G01B 5/02; G01B 7/02; G01B 5/207; G01B 5/20; G01B 5/24
USPC .......................................................... 33/503
See application file for complete search history.

(56) References Cited

U.S. PATENT DOCUMENTS

| 3,670,421 | A | * | 6/1972 | Kiewicz | ................. | G01B 3/44 |
|---|---|---|---|---|---|---|
| | | | | | | 33/561 |
| 4,122,607 | A | * | 10/1978 | Hopf | ..................... | G01B 7/28 |
| | | | | | | 33/555 |
| 4,659,988 | A | * | 4/1987 | Goff | ..................... | G01B 7/14 |
| | | | | | | 324/207.25 |

(Continued)

FOREIGN PATENT DOCUMENTS

| CN | 103890535 A | 6/2014 |
|---|---|---|
| CN | 204240976 U | 4/2015 |

(Continued)

*Primary Examiner* — Yaritza Guadalupe-McCall
(74) *Attorney, Agent, or Firm* — Bay State IP, LLC (57) ABSTRACT

The invention relates to a measuring device for measuring runout of an end face (6, 7) of an elongate profiled member (3), said measuring device comprising: at least one measuring head (33, 34) that can move back and forth along a longitudinal axis (L) and has a plurality of styluses (333, 343) which are placed next to each other, can individually move relative to the measuring head (33, 34) in the longitudinal direction and are oriented towards a support (31, 32) for the elongate profiled member (3), said support (31, 32) being located next to the measuring head (33, 34); and an evaluation unit that is connected in a data conducting manner to each of the styluses (333, 343) and calculates the runout from the individual values measured by the styluses (333, 343).

10 Claims, 7 Drawing Sheets

(56) References Cited

U.S. PATENT DOCUMENTS

| | | | | |
|---|---|---|---|---|
| 4,674,193 | A * | 6/1987 | Wertepny | G01B 5/207 33/550 |
| 4,843,854 | A * | 7/1989 | Ackerly | B21B 31/07 72/10.3 |
| 4,914,827 | A * | 4/1990 | Cook | G01B 3/002 33/549 |
| 4,916,824 | A * | 4/1990 | Shimazutsu | G01B 7/287 33/551 |
| 5,214,379 | A * | 5/1993 | Chern | G01B 7/281 324/207.16 |
| 6,427,353 | B1 * | 8/2002 | Nelson | G01B 5/00 33/542 |
| 6,954,991 | B2 * | 10/2005 | Akatsuka | G01B 11/2408 33/549 |
| 6,996,914 | B1 | 2/2006 | Istre | |
| 7,159,477 | B2 * | 1/2007 | Edwin | G01B 5/08 33/501.08 |
| 7,389,594 | B2 * | 6/2008 | Takahashi | G01B 5/20 33/549 |
| 7,748,134 | B1 * | 7/2010 | Wang | G01B 5/201 33/551 |
| 9,494,404 | B1 * | 11/2016 | Bresolin | G01B 5/043 |
| 2006/0026853 | A1 * | 2/2006 | Trionfetti | B24B 49/04 33/552 |
| 2014/0223752 | A1 | 8/2014 | Rattunde | |
| 2017/0080466 | A1 * | 3/2017 | Godwin | B21B 37/16 |
| 2018/0335291 | A1 * | 11/2018 | Rattunde | G01B 5/20 |

FOREIGN PATENT DOCUMENTS

| | | |
|---|---|---|
| DE | 42 25 195 A1 | 2/1994 |
| DE | 10 2006 019354 B3 | 7/2007 |
| DE | 10 2011 018297 A1 | 10/2012 |
| DE | 10 2011 116339 A1 | 4/2013 |
| JP | H11351807 A | 12/1999 |

* cited by examiner

TACTILE RUNOUT MEASUREMENT AND LENGTH MEASUREMENT

CROSS REFERENCE TO RELATED APPLICATION

This application is for entry into the U.S. National Phase under § 371 for International Application No. PCT/EP2016/077573 having an international filing date of Nov. 14, 2016, and from which priority is claimed under all applicable sections of Title 35 of the United States Code including, but not limited to, Sections 120, 363, and 365(c), and which in turn claims priority under 35 USC 119 to German Patent Application No. 10 2015 120 177.1 filed on Nov. 20, 2015.

The invention relates to a measuring device for measuring a runout of a planar face of an elongate profiled member. The invention also relates to a method for measuring a runout of a planar face of an elongate profiled member.

Rotationally symmetrical tubes and solid materials are further machined at the ends after the cutting to length of longitudinal profiled members by tube cutting machines.

In particular are being the ends of the workpieces are chamfered and planed. The demands made on the planar face are continuously increasing. As a rule it is necessary to produce a runout on the planar face of less than 0.05 mm.

Furthermore, it is necessary to measure the runout in the machine at full productivity, and accuracy of measurement of better than 1.2 µm is necessary. Since the productivity is high, i.e. the cycle time is only 1.3 seconds, it is necessary to measure the runout exactly within a very short time, and a measurement should be achieved within approximately 0.6 seconds.

DE 10 2011 018 297 A1 discloses a linear guide for a measuring device of a tube cutting machine, comprising a guide element which has a corrugated outer wall, wherein the guide element can be moved back and forth in a channel.

DE 42 25 195 A1 discloses a method for measurement of deviations of roundness and runout of a tube, wherein a rotor which is received by means of a play-compensating clamping holder in a testing machine is rotated, during the rotation the rotor is scanned by contacting or contactless sensors in the region of its circumferential and/or lateral surface, and from this a roundness and/or runout diagram is produced.

DE 10 2006 019 354 B3 discloses a profile measuring device for measuring the profile of a surface of a narrow body, in particular the profile of the surface of a wall of a tube end. The measuring device has two scanning heads which are movable obliquely relative to the direction of movement of the measuring head.

Known measuring devices have an individual measuring probe, past which a planar face is guided in a rotational movement about a longitudinal axis of the elongate profiled member. In this case measured values are determined and the measured values are then evaluated. Because of the rotational movement of the elongate profiled member the accuracy of measurement is not high enough, and the measurement duration is too long, in order to meet the said requirements.

Therefore the object of the present invention is to provide a measuring device for determining the runout of a planar face of an elongate profiled member with a high accuracy of measurement and a short cycle time.

Furthermore, the object of the present invention is to provide a method which enables a runout of a planar face of an elongate profiled member with a high accuracy of measurement and a short cycle time.

With regard to the device, the object is achieved by a measuring device of the type referred to in the introduction and having the features of claim 1.

For measuring runout of a planar face of an elongate profiled member, at least one measuring head which can move back and forth along a longitudinal axis has a plurality of measuring probes which are arranged adjacent to each other and have a support for the elongate profiled member arranged adjacent to the measuring head, and the measuring head has an evaluation unit which is connected in a measurement data conducting manner to each of the measuring probes and calculates the runout from the individual measured values.

The invention makes use of the idea of determining the runout of a planar face of an elongate profiled member by simultaneously carrying out, in one single measuring operation, a plurality of individual measurements are carried out by a respective one of the measuring probes, and thus the measurement time is significantly shorter than in the case of known measuring devices, since a rotation of the elongate profiled member in the holder can be omitted; instead the individual measurement results are evaluated and the runout is calculated from the individual measured values.

The elongate profiled member preferably consists of profiled members which are rotationally symmetrical about the longitudinal axis, in particular tubes or solid profiled members of circular cross-section. However, it is also conceivable to use profiled members of any cross-section, in particular rectangular, triangular or square profiled members.

The planar face is understood to be the end surface of the elongate profiled member, in particular of the tube or solid profiled member; in the case of a tube the planar face is a ring, in the case of a solid profiled member it is a circular disc.

The runout is a measurement of the planarity of the planar face. The runout is the maximum distance by which the planar face moves forward and back during rotation about a longitudinal axis. If possible, during rotational movement of the planar face the runout should be less than 0.05 mm. In order to measure a runout of 50 µm sufficiently accurately, a better accuracy of measurement, i.e. less than 1.25 µm, is necessary. The measuring device according to the invention enables an accuracy of measurement more precise than 1.25 µm, and in this case the individual measurement only takes 0.6 sec. In this case the duration of the measurement also includes the insertion of the elongate profiled member into the support, the actual measurement with the movement of the measuring head towards the planar face and the removal of the elongate profiled member and the evaluation.

In order to be able to carry out a measurement in a production process in a machine, it is necessary for the measuring device to have a measurement capability index, the so-called Cgk value, of at least 1.33. If this Cgk value is not met, the measuring device is not suitable for the tolerance to be measured. The measurement capability Cg is calculated according to $Cg=0.2*T/6/Sg$, where T is the tolerance and Sg is the standard deviation of the measurements. Cg must be at least 1.33 or higher. The Cgk value also takes account of the position of the mean value and is only equal to the Cg value when the mean value corresponds to the nominal value. Otherwise the Cgk value is always correspondingly smaller. If it is assumed that the mean value of the measurements is equal to the nominal value, then the accuracy of measurement, i.e. the standard deviation in the above formula of the measuring system is calculated with a tolerance of 0.05 mm to $Sg=0.2*0.05/6/1.33=0.00125$ mm or 1.25 μm. An accuracy of measurement of 1.25 μm for a tolerance von T=50 μm appears very high, but in practice it has proved necessary to be able to rely sufficiently on the measured value.

The measuring device preferably has two measuring heads lying opposite one another along the longitudinal axis and between which the support for the elongate profiled member is arranged. In this case measuring probes of one head face one side of the support and further measuring probes of the further measuring head face the other side of the support. Each of the measuring probes and each of the further measuring probes is designed to be movable in the longitudinal direction individually and independently of the other measuring probes and the further measuring probes.

The further measuring probes, like the measuring probes of the measuring head, are preferably likewise arranged adjacent to one another on the further measuring head. The configuration of the measuring device with two measuring heads makes it possible to measure the runout of opposing ends of the elongate profiled member, in particular of the tube section or of the solid profiled section, simultaneously.

Advantageously, in cross-section perpendicular to the longitudinal direction, runouts of circular longitudinal profiled members are determined with the measuring device, and therefore the measuring probes and/or the further measuring probes are arranged in a circle on the measuring head or the further measuring head. However, other profiled members are also conceivable, in particular the profiled members referred to above. In particular, in the case of the other profiled members, the measuring probes can also be arranged on the measuring head and adapted to the profiled members.

Each of the measuring probes preferably has a bearing surface for the contact with the elongate profiled member, and furthermore a measuring system, which is arranged on the measuring probe opposite the bearing surface and is connected to the evaluation unit in a measurement data conducting manner, is associated with each measuring probe. The measuring system can be a tactile measuring probe which can determine a displacement of the measuring probe along the longitudinal axis with an accuracy of less than one micrometre. However, the measurement systems can also be inductive path measuring systems, laser measuring systems or other measuring systems. Combinations of the types of measuring system are also conceivable.

The further measuring head is advantageously also designed to be displaceable back and forth along the longitudinal axis.

In a particularly preferred embodiment of the invention the measuring device has a position transmitter associated with the measuring head and a further position transmitter associated with the measuring head; the position transmitter and the further position transmitter can determine the position of the measuring head or further measuring head. In this way it is possible to determine both the runout and also the length of the elongate profiled member and, by means of the evaluation unit, from the length and taking account of the runout to draw a conclusion as to a maximum length, minimum length and mean length of the elongate profiled member along the longitudinal axis.

With regard to the method, the object is achieved by a method with the features of claim 8.

The method for measuring a runout of a planar face of the elongate profiled member comprises the steps according to the invention, that the elongate profiled member is placed into a support, at least one measuring head with a plurality of measuring probes arranged adjacent to one another along a longitudinal axis is moved towards the planar face, until all measuring probes touch a portion of the planar face and measured values of the measuring probe are supplied to an evaluation unit which calculates the runout from individual measured values.

The method according to the invention is suitable in particular to be carried out with one of the above-mentioned measuring devices.

Differential values, preferably of adjacent measuring probes, are preferably calculated from the individual measurement values and the runout is calculated from the differential values.

The method is particularly short, i.e. the measurement can be obtained in less than 0.6 seconds, since the elongate profiled member only has to be placed in the bearing surfaces and a measuring head or, in another embodiment of the method, a measuring head and a further measuring head are simultaneously moved to the ends of the elongate profiled member and simultaneously a plurality of individual measurements are carried out on each of the measuring probes or further measuring probes of the further measuring head, and in the evaluation unit the runout is calculated from the simultaneously obtained measured values. Therefore it is not necessary to guide the elongate profiled member along a measuring head, for example by rotational movements or the like.

The invention is described with reference to an exemplary embodiment in seven drawings, in which.

Figure 1:
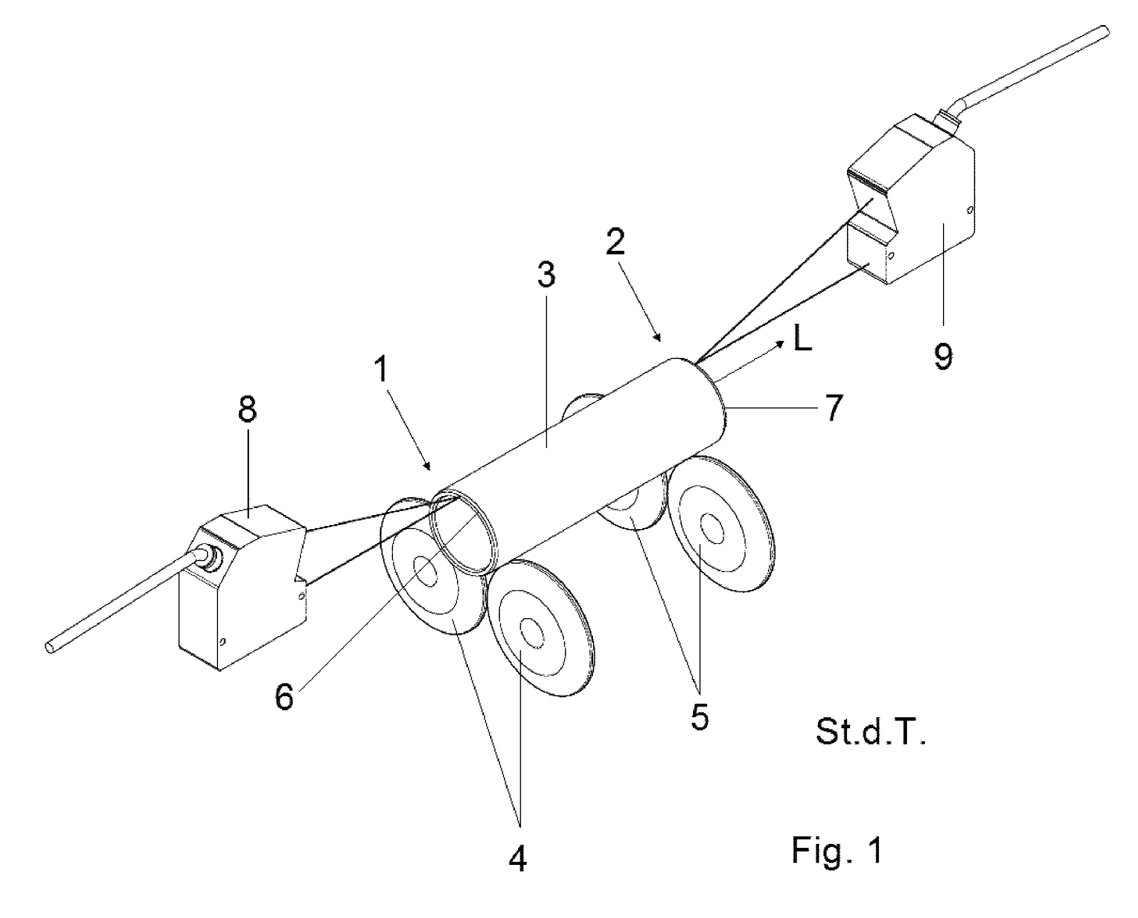
FIG. 1 shows a first measuring device according to the prior art for determining a runout error.

In the prior art a runout error of two ends 1, 2 of a tube section 3 is measured in a known manner by means of two laser systems. In this case the tube section 3 is mounted on two bearing rollers 4, 5 rotating in the same direction. The individual bearing rollers are driven in rotation in the same direction, and as a result the tube section 3 is set in rotary motion about its longitudinal axis L. During the rotation of the tube section 3 a measurement of two planar end faces 6, 7 of the pipe sections 3 is carried out by means of two laser measuring systems 8, 9.

It is problematic that the laser measuring systems 8, 9 react to superficial changes of the planar faces 6, 7, for example alternating reflective and matte surfaces, with measurement inaccuracies. Furthermore, the axial position of the rotating tube section 3 during the rotation is not constant, since technical inaccuracies occur in the case of the bearing rollers 4, 5. As a result of this an accuracy of measurement of less than 3 μm cannot be achieved.

Figure 2:
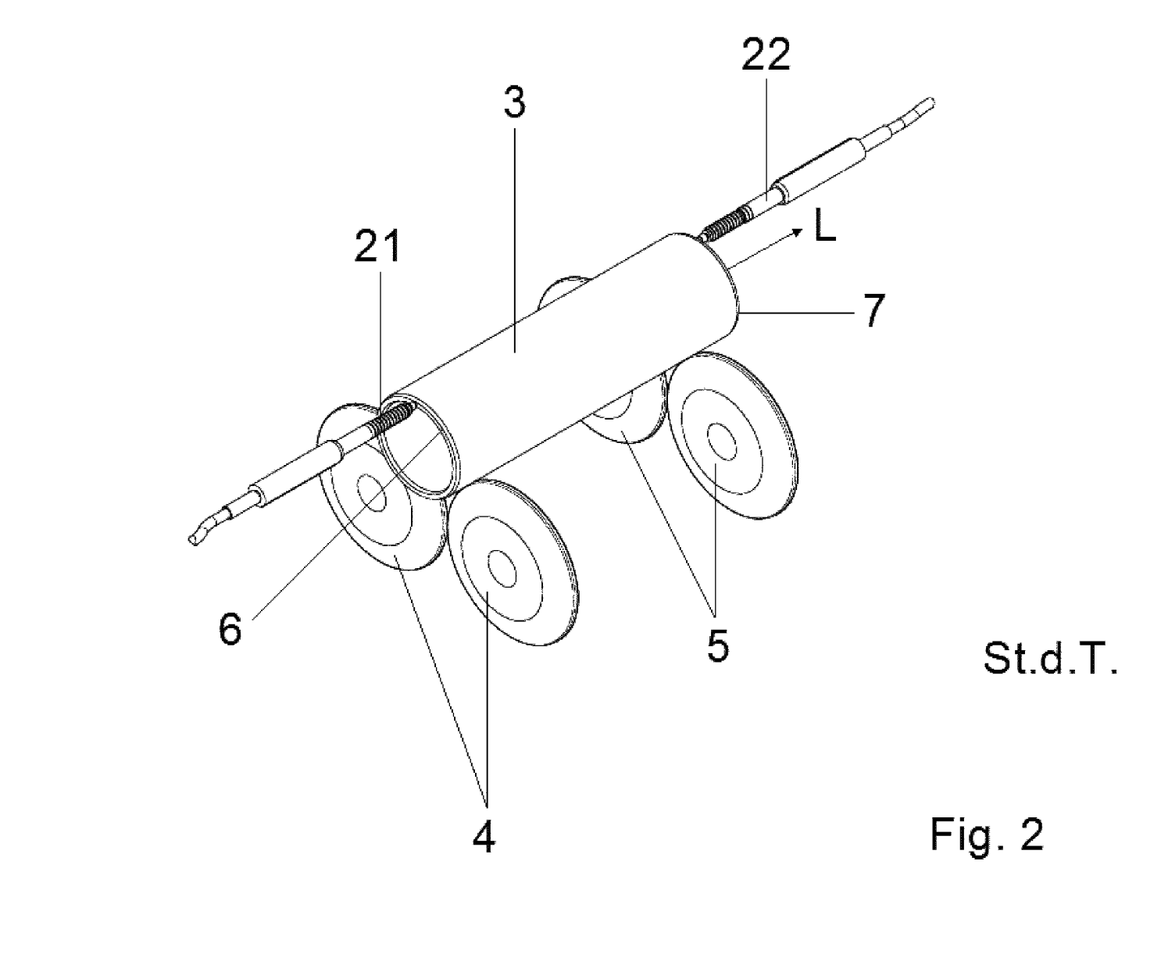
FIG. 2 shows a second measuring device according to the prior art for determining a runout error.

FIG. 2 shows a second known measuring device, in which again pairs of bearing rollers 4, 5 rotating in the same direction are provided, on which the tube section 3 rotates about its longitudinal axis L. At the ends 1, 2 of the tube section 3 two tactile measurement systems 21, 22 are installed, which are in each case directed onto one of the planar faces 6, 7 of the tube section 3 and touch the respective planar face 6, 7. Since the tactile measuring system 21, 22 exerts a force on the tube section 3 and thus the tube section is additionally axially deflected, measurement errors are present, and the accuracy of the tactile measuring system 21, 22 of less than 3 μm is not possible.

Figure 3:
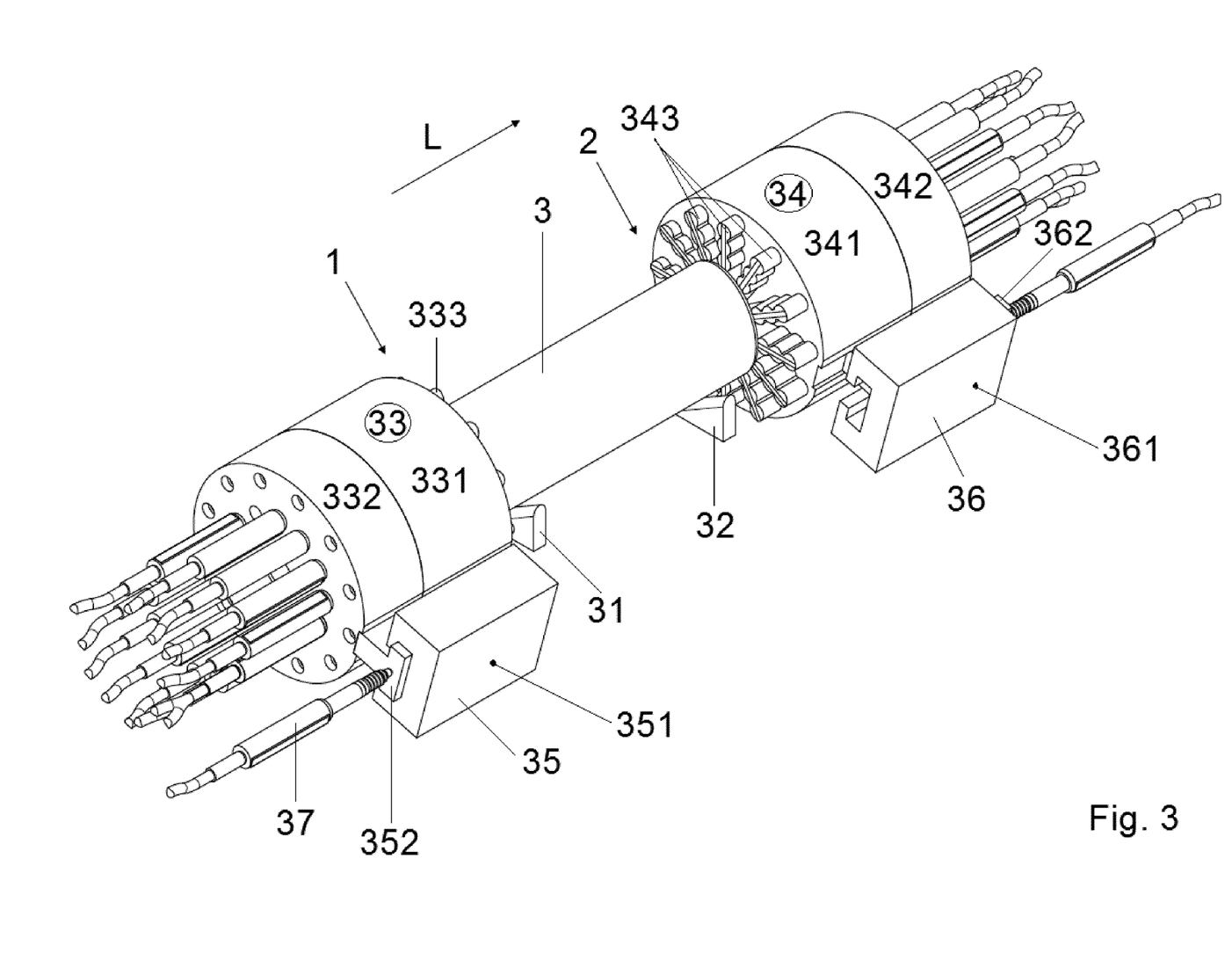
FIG. 3 shows a measuring device according to the invention for determining the runout error of one of the planar faces of two ends of a tube section.

However, the measuring device according to the invention which is illustrated in FIG. 3 enables accuracy of measurement of better than 1 μm. The measuring device according to FIG. 3 has two support prisms 31, 32, on which the tube section 3 is mounted immovably relative to the support prisms 31, 32 during the measurement. Along the longitudinal axis L of the tube sections 3 a measuring head 33 is provided on one tube section end 3 and a further measuring head 34 is provided on the further tube section end 2. The measuring head 33 and the further measuring head 34 are designed to be movable back and forth in the direction of the longitudinal axis L by means of an electrical drive (not shown). The two measuring heads 33, 34 have, laterally, a position transmitter 35 or a further position transmitter 36. The position transmitter 35, 36 has a U-shaped guide 351, into which is recessed a T-shaped armature 352 which is fixedly connected to the measuring head 33. The same applies for the further measuring head 34 and the design of the further guide 361 and the further armature 362.

A position measuring system 37 for the measuring head 33 is provided on an end face of the armature 352 remote from the tube section 3. The same applies to the measuring head 34.

The measuring head 33 itself has a measuring probe guide 331, which faces the support prisms 31, 32, and a pressure lid 332. A plurality of, in the present example twelve, measuring probes 333 are arranged in a ring in the measuring probe guide 331. However, more or fewer measuring probes 333 can also be provided. Correspondingly, the further measuring head 34 comprises a further measuring probe guide 341 and a further pressure lid 342. Twelve further measuring probes 343 are arranged in the further measuring probe guide 341. The further measuring probes 343 are components which are displaceable back and forth in the direction of the longitudinal axis L and are movable individually relative to the measuring probe guide 331, said components being in each case arranged in a respectively associated individual guide so as to be movable relative to the further measuring probe guide 341. An outer circumference of each further measuring probe 343 has an undulating form in order to enlarge the contact surface, so that its individual guide is stabilised. The same applies in turn to the measuring probe 333.

Figure 4:
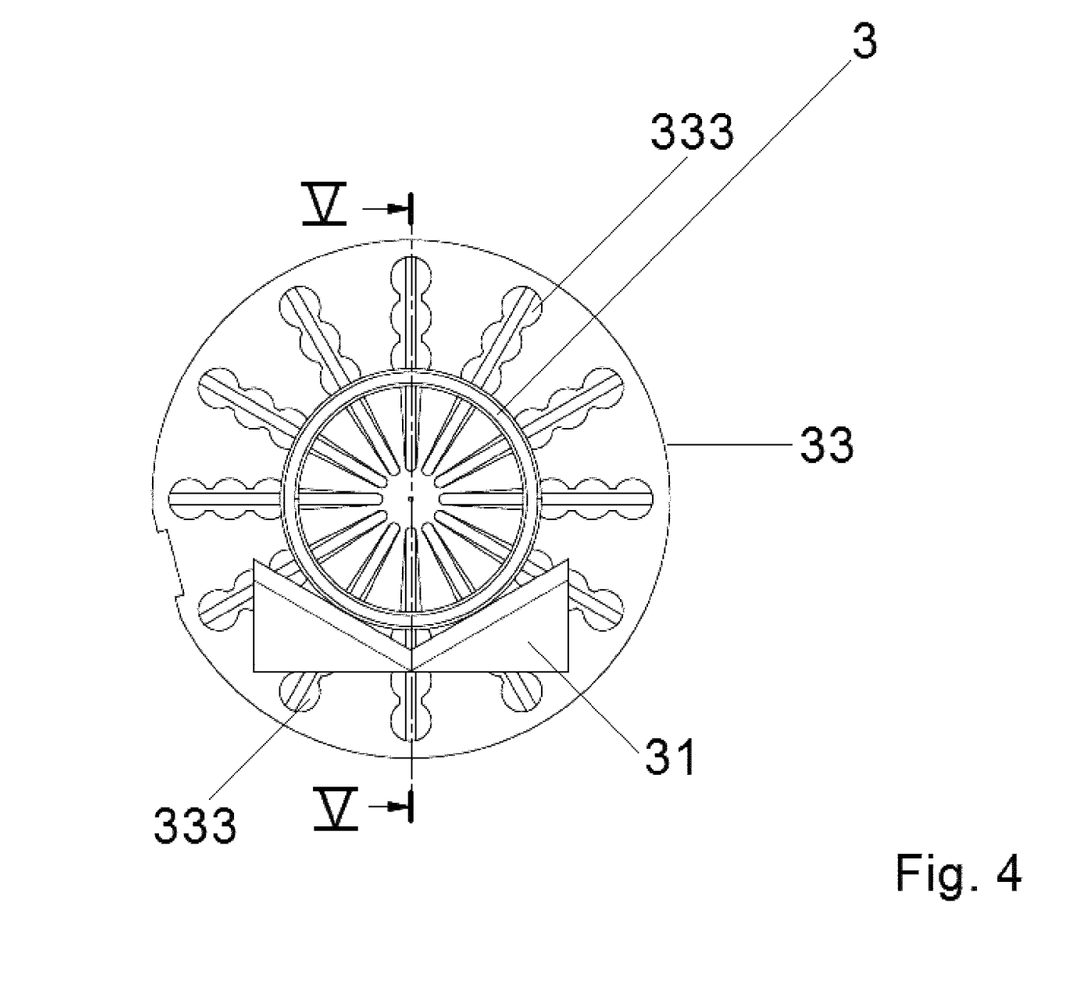
FIG. 4 shows a front view of a measuring head in FIG. 3.

FIG. 4 shows a front view of the measuring head 33 in FIG. 3 with a view through the tube section 3 recessed into the support prism 31. The longitudinal axis L of the tube sections 3 and the longitudinal axis L of the measuring head 33 coincide here. However, it is also conceivable that the measurement is carried out with an arrangement which is not exactly concentric, that is to say the longitudinal axis L of the tube section 3 and a longitudinal axis of the measuring head 33 are offset parallel to one another or are even arranged offset at a small angle relative to one another. FIG. 4 shows the twelve measuring probes 333 of the measuring head 33, which have in their end facing the tube section 3 a bearing surface for the tube section 3, so that each of the measuring probes 333 comes into contact with a region of the tube section 3 when the measuring head 33 is moved along the longitudinal axis L onto the tube section 3 for measuring the runout and a length of the tube section 3.

Figure 5:
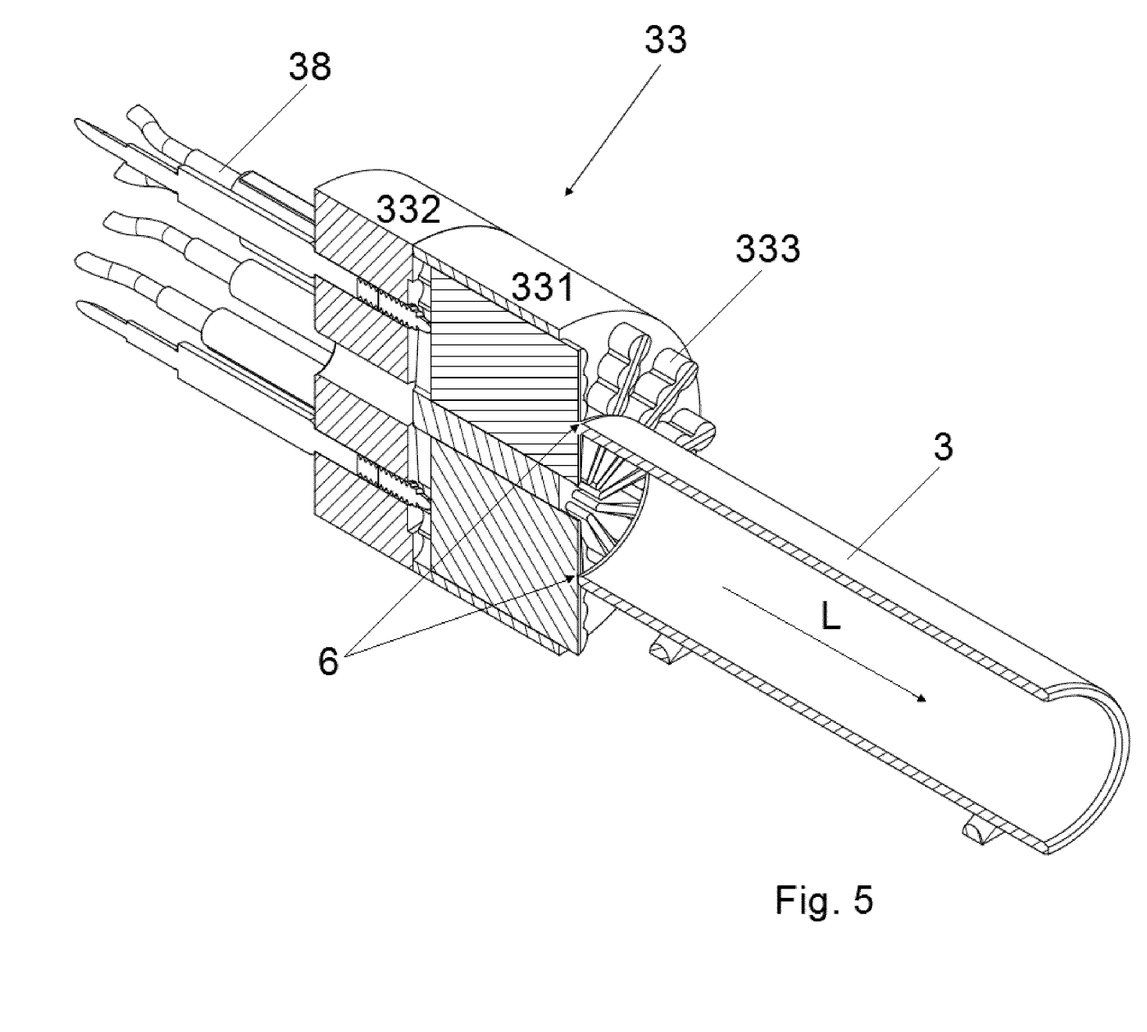
FIG. 5 shows a sectional view along the line V-V in FIG. 4.

FIG. 5 shows a sectional view of FIG. 4 along the line V-V. In particular, on the basis of the measuring probe 333 cut away along the longitudinal axis L in the twelve o'clock position and six o'clock position, it can be seen that the measuring probes 333 are solid profiled components which are narrow in a radial direction, and are designed to be movable back and forth along the longitudinal axis L of the measuring head 33, but in this case they have a very stable individual guide due to their undulating outer wall. The part of the measuring head 33 facing the tube section 3 is the measuring probe guide 331, and the part of the measuring head 33 remote from the tube section 3 is the pressure lid 332 which is placed against the measuring head 33. A measuring system 38 is provided in the pressure lid 332 for each measuring probe 333. Each of the twelve measurement systems 38 is a tactile measuring probe, which measures the displacement of the associated measuring probe 333 along the longitudinal axis L exactly with an accuracy of better than 1 μm. In particular, different displacements of the measuring probes 333 due to an error in the planar face 6 of the tube section 3 can be detected.

Figure 6:
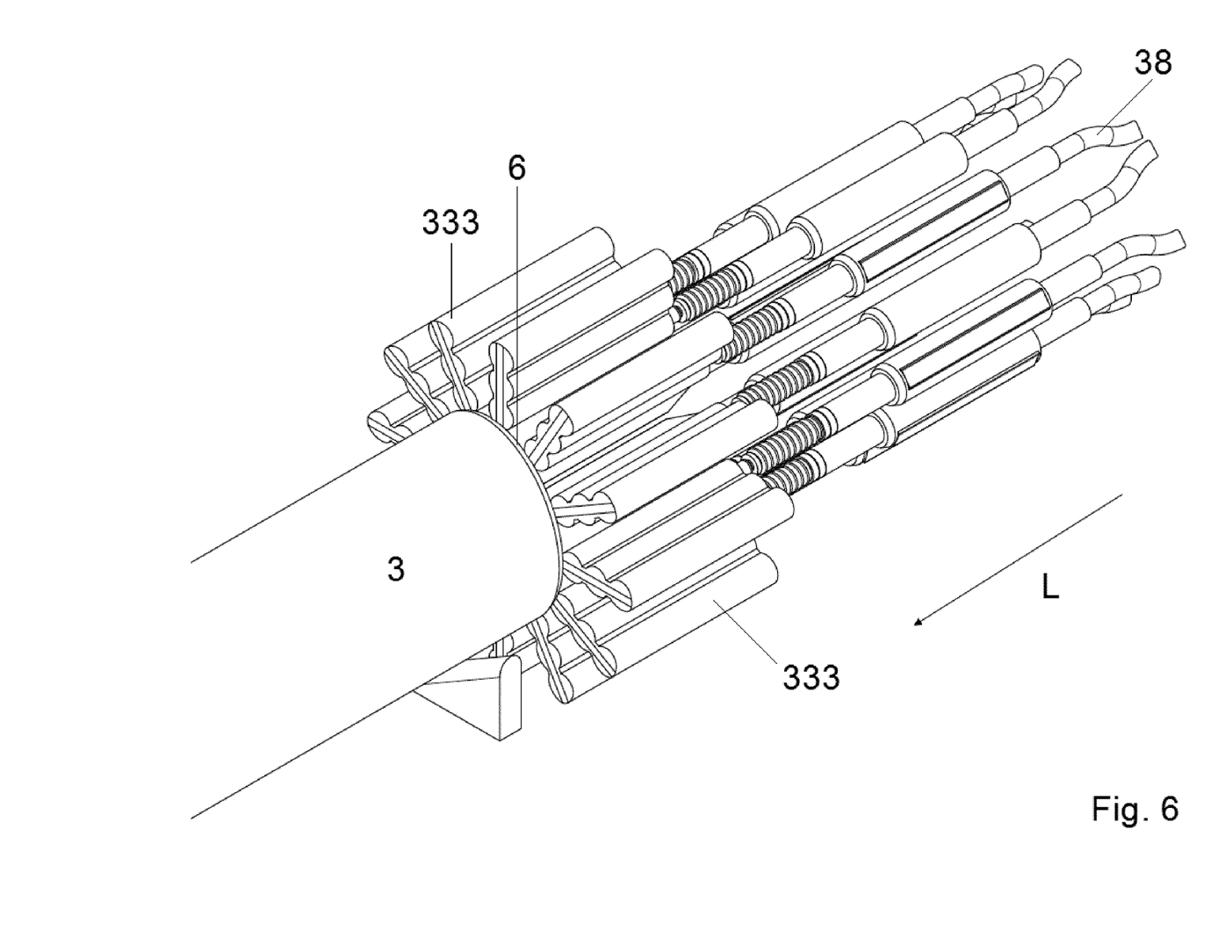
FIG. 6 shows a front view of the measuring head in FIG. 3.

FIG. 6 shows the internal arrangement of the measuring head 33 with the twelve measuring probes 333 abutting the planar face 6 and the measurement systems 38 opposite the planar face 6 on the opposing measuring probes 333, which measurement systems exactly measure a change of position along the longitudinal axis L for each measuring probe 333. In this case the accuracy is better than 1 μm. A longitudinal axis L of the tube section 3 and of the individual measurement systems 38 as well as the direction of movement of the measuring probe 333 are situated parallel to one another in pairs.

Figure 7:
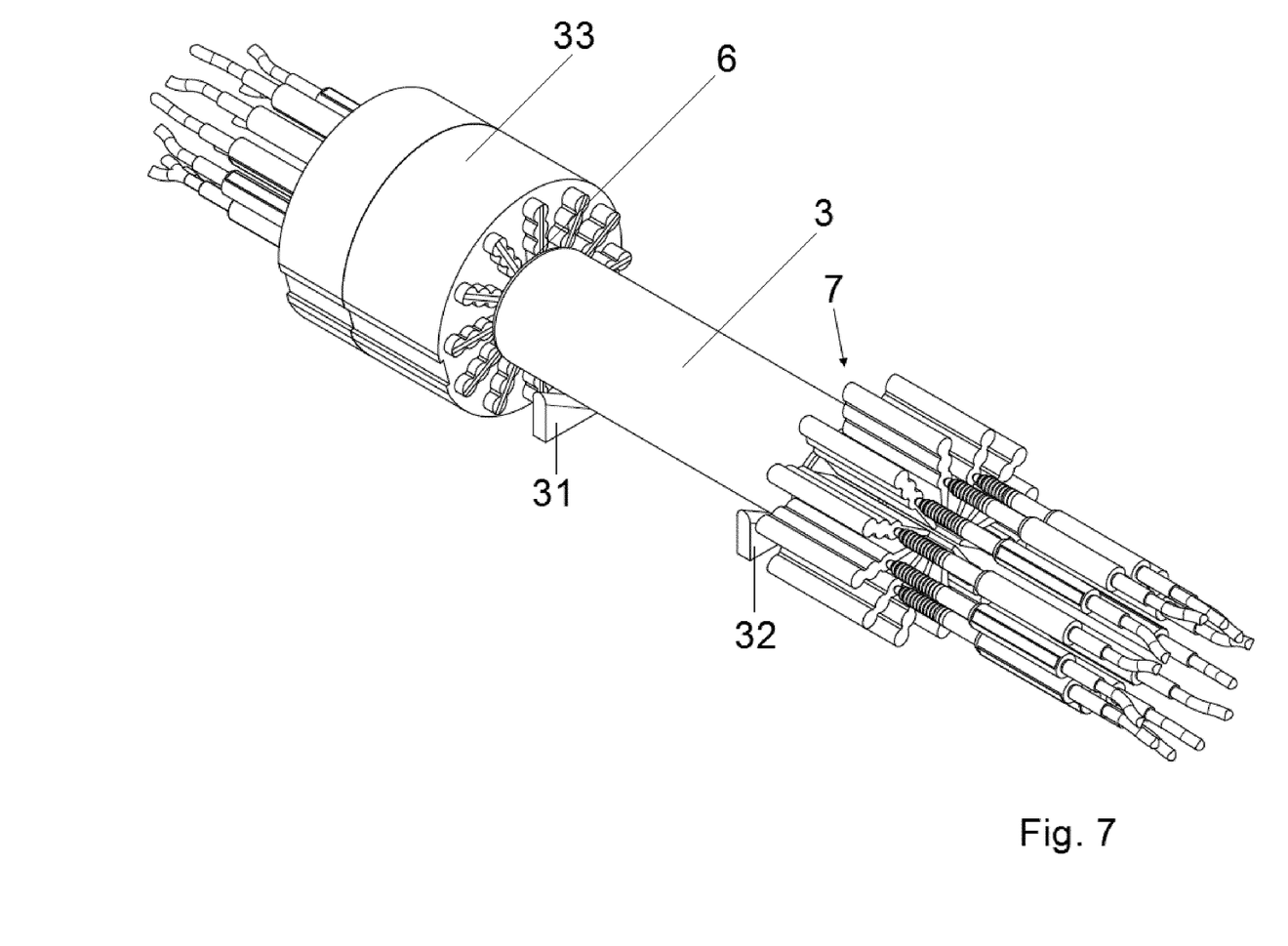
FIG. 7 shows an interior view and exterior view of a further measuring head.

FIG. 7 shows the arrangement of the measuring head 33 and of the covered further measuring head 34, which are constructed symmetrically relative to one another. In this case each of the measuring heads 33, 34 has twelve measuring probes 333, 343. Naturally, a higher or lower number of measuring probes 333, 343 on each of the two measuring heads 33, 34 is conceivable. The number of measuring probes 333, 343 on the two measuring heads 33, 34 can also be different from one another.

In order to carry out the measurement of a runout error of the two planar faces 6, 7 of the tube sections 3, first of all the two measuring heads 33, 34 are moved away from one another. The tube section 3 is placed onto the two support prisms 31, 32, and the two measuring heads 33, 34 are then simultaneously moved towards the two tube ends 1, 2 until the measuring probes 333, 343 in each case come into contact with a respective section of the planar face 6, 7. When each of the measuring probes 333, 343 is in contact with one of the two planar faces 6, 7 of the tube sections 3, the measured values of the twelve measuring probes 333 of the measuring head 33 and of the twelve further measuring probes 343 of the further measuring head 34 are recorded. From the twelve individual measurement values per measuring head 33, 34, by formation of the difference of the measured values of adjacent individual measuring probes 333, 343 the profile of the planar face 6 can be determined by interpolation of the individual points. Thus the planar face 6 can be determined with an error of less than 1 μm. A corresponding measurement will be carried out with the further measuring head 34 on the further planar face 7. The evaluation likewise corresponds to the evaluation of the measured values of the measuring probe 333 on the planar face 6.

In addition, a distance of the two measuring heads 33, 34 from one another is determined by means of the two position transmitters 35, 36 on the two measuring heads 33, 34, and thus a conclusion can be drawn as to a length of the tube sections 3 taking account of the planar face error. The calculations take place in an evaluation unit (not shown). Thus it is possible to specify a maximum tube length, a minimum tube length and a mean tube length.

LIST OF REFERENCE NUMERALS 1 end of the tube section
2 end of the tube section
3 tube section
4 bearing roller
5 bearing roller
6 planar face
7 planar face
8 laser measuring system
9 laser measuring system
21 tactile measuring system
22 tactile measuring system
31 support prism
32 support prism
33 measuring head
34 measuring head
35 position transmitter
36 position transmitter
37 position measuring system
38 measurement systems
331 measuring probe guide
332 pressure lid
333 measuring probe
341 measuring probe guide
342 pressure lid
343 measuring probe
351 U-shaped guide
352 T-shaped armature
361 U-shaped guide
362 T-shaped armature
L longitudinal axis

The invention claimed is:

1. Measuring device for measuring a runout of a planar face (6, 7) of an elongate profiled member (3), comprising
   at least one measuring head (33, 34) which can move back and forth along a longitudinal axis (L) and has a plurality of measuring probes (333, 343) which are arranged adjacent to each other, can move individually in the longitudinal direction relative to the measuring head (33, 34) and are oriented towards a support (31, 32) for the elongate profiled member (3), said support being arranged adjacent to the measuring head (33, 34); and an evaluation unit which is connected in a data conducting manner to each of the measuring probes (333, 343) and calculates the runout from the individual values measured by the measuring probes (333, 343).

2. Measuring device according to claim 1, characterised by two measuring heads (33, 34) which are arranged opposite one another along the longitudinal axis (L) and between which the support (31, 32) for the elongate profiled member (3) is arranged, and in that measuring probes (333) of one measuring head (33) and further measuring probes (343) of the further measuring head (34) in each case face the support (31, 32), and the further measuring probes (343) are designed to be movable in the longitudinal direction relative to the further measuring head (34) and are arranged adjacent to one another.

3. Measuring device according to one of claim 2, characterised in that the further measuring head (34) is designed to be displaceable back and forth along the longitudinal axis (L).

4. Measuring device according to claim 1, characterised in that the measuring probes (333) and/or the further measuring probes (343) are arranged in a circle.

5. Measuring device according to one of claim 1, characterised in that each of the measuring probes (333) has a bearing surface for the elongate profiled member (3) and a measuring system (38), which is connected in a data conducting manner to the evaluation unit, is associated with each measuring probe (333).

6. Measuring device according to claim 5, characterised in that the measuring system (38) comprises a tactile measuring probe.

7. Measuring device according to claim 1, characterised in that a position transmitter (35) is associated with the measurement head (33) and a further position transmitter (36) is associated with the further measurement head (34).

8. Method for measuring a runout of a planar face (6, 7) of an elongate profiled member (3), in which the elongate profiled member (3) is placed into a support (31, 32),
   at least one measuring head (33, 34) with a plurality of measuring probes (333, 343) arranged adjacent to one another along a longitudinal axis (L) is moved towards the planar face (6, 7), until all measuring probes (333, 343) touch a portion of the planar face (6, 7) and individual measured values of the measuring probes (333, 343) are supplied to an evaluation unit which calculates the runout from individual measured values.

9. Method according to claim 8, characterised in that differential values are calculated from the individual measured values and the runout is calculated from the differential values.

10. Method according to claim 8,
    characterised in that position measurement values of the measurement head (33) and of the further measurement head (34) are in each case measured by means of a position transmitter (35, 36) and a length of an elongate profiled member is determined from the position measurement values taking account of the runout.

* * * * *